United States Patent [19]
Fujihiro et al.

[11] Patent Number: 5,938,007
[45] Date of Patent: Aug. 17, 1999

[54] CONVEYING BELT AND METHOD OF FORMING THE BELT

[75] Inventors: Kazutoshi Fujihiro, Kakogawa; Yoshinori Furukawa, Gakuen-Higashimachi; Hiroyuki Ito, Kobe, all of Japan

[73] Assignee: Mitsuboshi Belting Ltd., Kobe, Japan

[21] Appl. No.: 08/954,015

[22] Filed: Oct. 20, 1997

[30] Foreign Application Priority Data

Oct. 21, 1996 [JP] Japan .................. 8-297994

[51] Int. Cl.⁶ ............ B65G 15/34; B65G 45/02; B32B 27/00

[52] U.S. Cl. ............ 198/847; 198/500; 428/421; 428/422; 442/82; 442/94; 442/98; 442/168

[58] Field of Search ............ 198/846, 847, 198/500; 428/421, 422; 442/61, 82, 88, 94, 98, 168, 289

[56] References Cited

U.S. PATENT DOCUMENTS

| 3,933,503 | 1/1976 | Schonberg | 428/422 |
|---|---|---|---|
| 4,469,729 | 9/1984 | Watanabi et al. | 198/846 |
| 4,572,359 | 2/1986 | Fujita et al. | 198/500 |
| 4,674,622 | 6/1987 | Utsunomiya et al. | 198/500 |
| 5,383,828 | 1/1995 | Sands et al. | 198/847 |
| 5,564,196 | 10/1996 | Hirotoshi et al. | 428/421 |
| 5,645,157 | 7/1997 | Kitano et al. | 198/847 |
| 5,658,670 | 8/1997 | Fukushi et al. | 428/421 |

*Primary Examiner*—William E. Terrell
*Assistant Examiner*—K W Bower
*Attorney, Agent, or Firm*—Wood, Phillips, VanSanten, Clark & Mortimer

[57] ABSTRACT

A conveying belt has a core and a canvas layer attached to the core. The canvas layer has a first surface facing the core and a second surface facing oppositely to the first surface. The canvas layer has a thickness between the first and second surfaces. The canvas layer is treated with fluororesin so that the second surface is impregnated with fluororesin and only part of the thickness between the first and second surfaces is impregnated with fluororesin.

31 Claims, 3 Drawing Sheets

CONVEYING BELT AND METHOD OF FORMING THE BELT

BACKGROUND OF THE INVENTION

1. Field of the Invention

This invention relates to belts and, more particularly, to a conveying belt having a treated surface which contacts and conveys objects as the conveying belt is advanced. The invention is also directed to a method of forming the conveying belt.

2. Background Art

Conveying belts are used in a wide range of environments. The conveying belt has an exposed surface which engages objects and through frictional forces generated between the conveying belt and objects in contact therewith causes conveyance of the objects as the conveying belt is advanced. Designers of this type of belt must consider a number of different objectives. The conveying surface must positively convey objects in operation. At the same time, the conveying surface must be resistant to adherence of the conveyed objects so that unimpeded separation between the conveying belt and objects occurs at the appropriate time. The conveying surface should also be resistant to adherence of other foreign matter, particularly that which leaches or leaks from the objects conveyed.

To accomplish the above objectives, it is known to use a canvas material as the top exposed layer on the conveying belt and to coat the canvas with a fluororesin. Conveying belts so treated generally have good stability at both high and low temperatures, are chemically inactive, have a low frictional coefficient between the conveying surface and objects being conveyed, and facilitate stripping of material from the belt surface. Conveying belts with a fluororesin treated canvas conveying surface have proven to be highly useful in fields in which various operations are carried out directly on the conveying belt, and particularly in an environment where a wide belt having a large conveying operating surface is used. One exemplary conveying belt is shown in Japanese Provisional Publication No. 7-60877. In this patent document, a treated belt is shown as a component of a corrugated board manufacturing machine.

In FIG. 5 herein, a corrugated board manufacturing machine, incorporating a belt such as shown in Japanese Provisional Publication No. 7-60877, is shown at 10. A web 12 is continuously directed between a pair of meshing, toothed rolls 14, 16 which impress a corrugated, fluted pattern into the web 12. A sizing machine 18 applies starch sizing material to the apices 20 of the flutes on one side 22 of the web 12. An endless belt 24 is trained around a pair of spaced pulleys 26, 28 downstream of the sizing machine. The relative position of the pulleys 26, 28 is selected to produce a predetermined tension on the belt 24. The unsupported region of the belt 24 between the pulleys 26, 28 is biasably urged over a portion of the roll 16. A liner 30 is continuously advanced between the belt 24 and roll 16 and is pressed by the belt 24 against the advancing web 12 to effect adherence between the liner 30 and the apices 20 on the web 12. The completed corrugated board 32 exits from between the pulley 26 and roll 16. Heat is imparted to the web 12 and liner 30 at a location between the belt 24 and roll 16 to evaporate water in the web 12 and thereby assure accurate flute formation on the web 12.

The exposed belt surface 34, which is commonly canvas, is treated with a blend of powdery fluororesin and a heat resistant elastomer in relatively large quantities to facilitate separation of the completed board 32 from the exposed conveying surface 34 of the belt 24. This treatment also facilitates removal of foreign matter such as adhesive that leaks from the board 32 to the belt surface 34.

While the fluororesin treatment reduces the coefficient of friction between the belt 24 and board 32, the fluororesin compromises the adhesion of the canvas layer defining the exposed surface 34 on the belt 24 with other belt components/layers. As a result, there is a tendency of the canvas layer to peel, which compromises the durability and longevity of the belt 24.

The presence of the heat resistant elastomer in the treatment composition also increases surface friction between the belt surface 34 and objects being conveyed. As a result, separability may be compromised. There may also be a tendency of foreign matter, such as adhesive, to more aggressively adhere to the conveying surface 34.

SUMMARY OF THE INVENTION

In one form of the invention, a conveying belt has a core and a canvas layer attached to the core. The canvas layer has a first surface facing the core and a second surface facing oppositely to the first surface. The canvas layer has a thickness between the first and second surfaces. The canvas layer is treated with fluororesin so that the second surface is impregnated with fluororesin and only part of the thickness between the first and second surfaces is impregnated with fluororesin.

In one form, the first surface of the canvas layer is not impregnated with fluororesin.

In one form, the canvas layer is not impregnated with fluororesin from the first surface to approximately one-half of the thickness between the first and second surfaces.

The canvas layer may be a high density woven canvas which is attached to the core as through an elastomer.

The core may be a canvas layer.

In one form, the conveying belt has a length and width and the core canvas layer is seamless over the entire length and width of the conveying belt.

In one form, the canvas layer attached to the core is extensible lengthwise of the conveying belt.

In one form, the conveying belt has a width on the order of 1200–3000 mm and a thickness on the order of 3.5 mm.

The fluororesin may be at least one of tetrafluoroethylene-per fluoroalkylvinylether copolymer (PFA), tetrafluoroethylene-hexafluoropropylene copolymer (FEP), polytetrafluoroethylene (PTFE), and polychlorotrifluoroethylene (PCTFE).

The second surface and part of the thickness of the canvas layer may be impregnated with fluororesin through a first process by fusion-depositing a fluororesin film onto the second surface of the canvas layer.

The second surface and part of the thickness of the canvas layer may be impregnated with fluororesin through a second process by applying a fluororesin dispersion onto the second surface and thereafter subjecting the canvas layer to at least one of a firing and a heat press treatment.

Alternatively, the second surface and part of the thickness of the canvas layer may be impregnated with fluororesin by fusion-depositing a fluororesin film onto the second surface after subjecting the canvas layer to the at least one of firing and heat press treatment through the second process.

In one form, the core is a woven fabric made up of at least one of aromatic polyamide fiber yarn and polyetheretherketone fiber yarn.

The core canvas may be woven by one of a plain weave, matt weave, twill elastic webbing, and satin weave process.

The core canvas may be made from woven cords each formed by twisting 2 to 10 yarns, each having a denier of 1000 to 2000, 50 to 100 twists/m with a cord density of 10 to 50 per 5 cm.

An elastomer layer may be provided between the core and canvas layer, with the elastomer layer being at least one of rubber and a synthetic resin that is at least one of styrene-butadiene rubber, ethylene propylene rubber, butyl rubber, hydrogenated nitrile rubber, fluorine rubber, and polytetrafluoroethylene.

Fibers may be embedded in the elastomer layer, with exemplary fibers having a length on the order of 2 to 20 mm and being made from at least one of aromatic polyamide fiber, cotton fiber, and polyester fiber, and present in an amount of 5 to 30 weight parts of fiber per 100 weight parts of the at least one of rubber and synthetic resin.

The canvas layer on the core may be made from a mixed-twisted yarn of aromatic polyamide fiber and urethane elastic fiber.

The canvas layer on the core may be made from yarns that are made from at least one of aromatic polyamide fiber yarn, nylon fiber yarn, and polyester yarn, that are woven by one of plain weaving, twill elastic webbing and satin weaving. The canvas layer on the core may alternatively be made from a knitted aromatic polyamide fiber yarn.

The canvas layer on the core may be made from para-aramid fiber yarn having a size of 100–300 denier with 1 to 3 twists.

The canvas layer on the core may be made from meta-aramid fiber yarn having a size from 20–40 yarn number count with 1 to 4 twists.

The yarn in the canvas layer on the core may be urethane elastic fiber yarn of 140 denier per yarn and a count of 100 to 140 yarns per 5 cm.

The yarns in the canvas on the core may be para-aramid fiber yarns having a size of 100 to 300 denier with 1 to 3 twists.

The yarns on the canvas layer on the core may be meta-aramid fiber yarns having a size of 20 to 40 spinning yarn number count and 1 to 4 twists.

The yarns in the canvas layer on the core may be at least one of nylon fiber yarn and polyester fiber yarn having a size of from 100 to 300 denier, with 1 to 3 twists and a count of from 70 to 100 per 5 cm.

At least one of the core and canvas layer may be made from fibers that are at least one of a) para-aramid fiber sold commercially under one of the trademarks TWARON™, KEVLAR™, TECHNORA™ and b) meta-aramid fibers sold commercially under one of the trademarks CORNEX™ and NOMEX™.

The invention is also directed to a method of forming and using a conveying belt, which method involves the step of: providing a canvas layer having first and second oppositely facing surfaces between which a thickness is defined; impregnating the second surface and only a part of the thickness between the first and second surfaces with a fluororesin; joining the canvas layer with at least one belt component to define a completed belt with the second surface exposed; and conveying an object by engaging the second surface with the object and advancing the conveying belt to thereby cause conveying of the object.

The impregnating step may involve the step of impregnating through a first process by fusion-depositing a fluororesin film onto the second surface of the canvas layer.

The impregnating step may involve the step of impregnating through a second process by applying a fluororesin dispersion onto the second surface and thereafter subjecting the canvas layer to at least one of a firing and heat press treatment.

The impregnating step may involve the step of impregnating by fusion-depositing a fluororesin film onto the second surface after performing the second process.

DETAILED DESCRIPTION OF THE DRAWINGS

Figure 1:
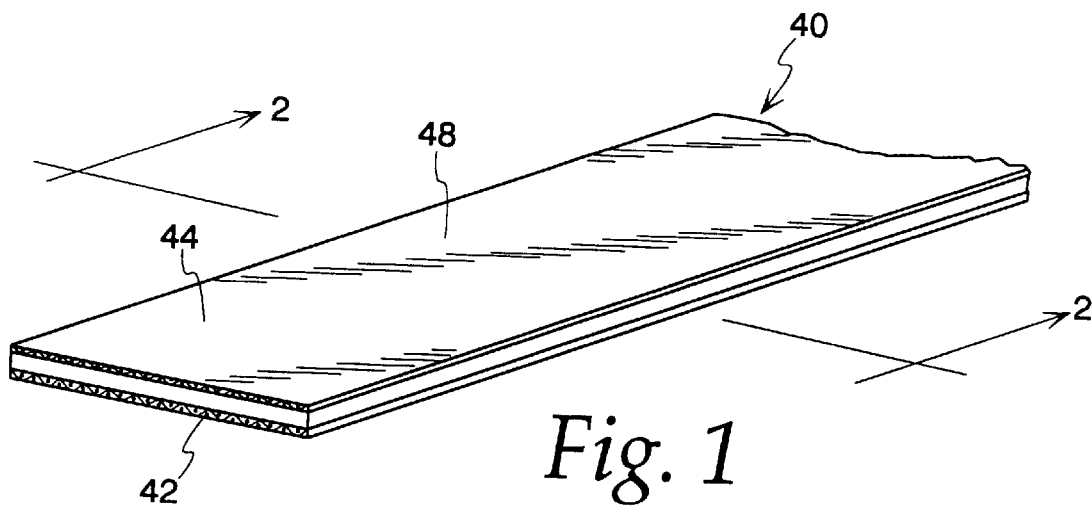
FIG. 1 is a fragmentary perspective view of a conveying belt, according to the present invention.
Figure 2:
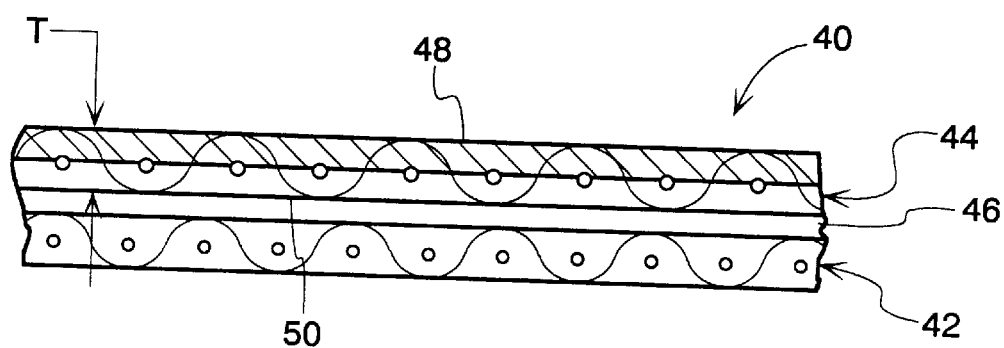
FIG. 2 is an enlarged, cross-sectional view of the conveying belt taken along line 2—2 of FIG. 1.

In FIGS. 1 and 2, a general purpose conveying belt, according to the present invention, is shown at 40. The conveying belt 40 consists of a core 42 and a canvas layer 44, attached to the core 42 by lamination through an elastomer adhesive layer 46. The canvas layer 44 has an exposed conveying surface 48 which engages and conveys objects as the conveying belt 40 is advanced. The layer 44 is a high density, plain woven canvas.

The above general arrangement of components in the conveying belt 40 is similar to those in the prior art. However, whereas in the prior art the full thickness T (FIG. 2) of the canvas layer 44 is impregnated with a fluororesin, in the inventive conveying belt 40, the canvas layer 44 is treated so that the conveying surface 48 is impregnated with fluororesin and only part of the thickness between the conveying surface 48 and the oppositely facing surface 50 is impregnated with fluororesin. In this case, approximately one-half of the thickness T from the conveying surface 48 towards the surface 50 is treated so that the surface 50 is not impregnated with the fluororesin. In FIG. 2 the portion of the canvas layer 44 impregnated is shaded. Preferably at least one-half of the thickness of the conveying belt 40 does not have any significant amount of fluororesin leached therethrough.

The fluororesin treatment may be carried out by various methods. For example, the treatment may be carried out by film forming or by using a thickener so that the canvas layer 44 is selectively impregnated.

Suitable fluororesins used for the impregnation process for the canvas layer 44 include tetra-fluoroethylene-perfluoroalkylvinylether copolymer (PFA), tetrafluoroethylene-hexafluoropropylene copolymer (FEP), polytetrafluoroethylene (PTFE), and polychlorotrifluoroethylene (PCTFE).

Leaching of the fluororesin fully through the thickness of the canvas layer 44 is inhibited by weaving the canvas layer 44 at a high density. As a result, the fluororesin does not permeate the canvas layer 44 to the surface 50 so that it does not adversely affect the bond between the canvas layer 44 and the other belt components.

Figure 3:
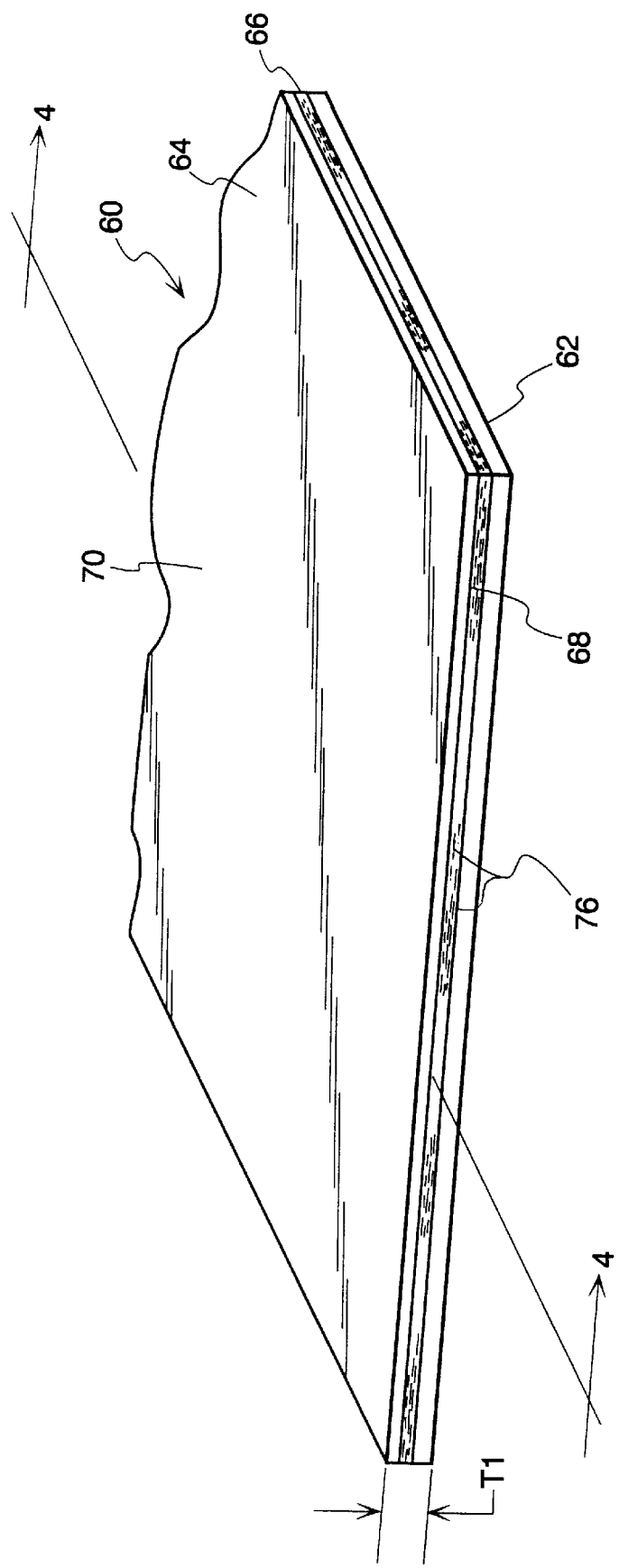
FIG. 3 is a fragmentary, perspective view of a wide conveying belt according the present invention.
Figure 4:
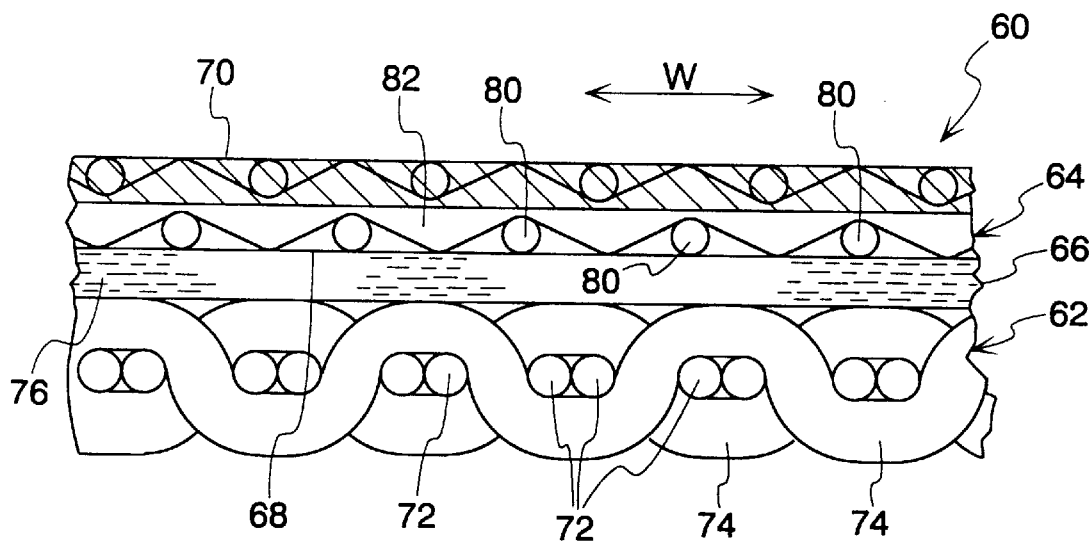
FIG. 4 is an enlarged, cross-sectional view of the conveying belt taken along line 4—4 of FIG. 3.
Figure 5:
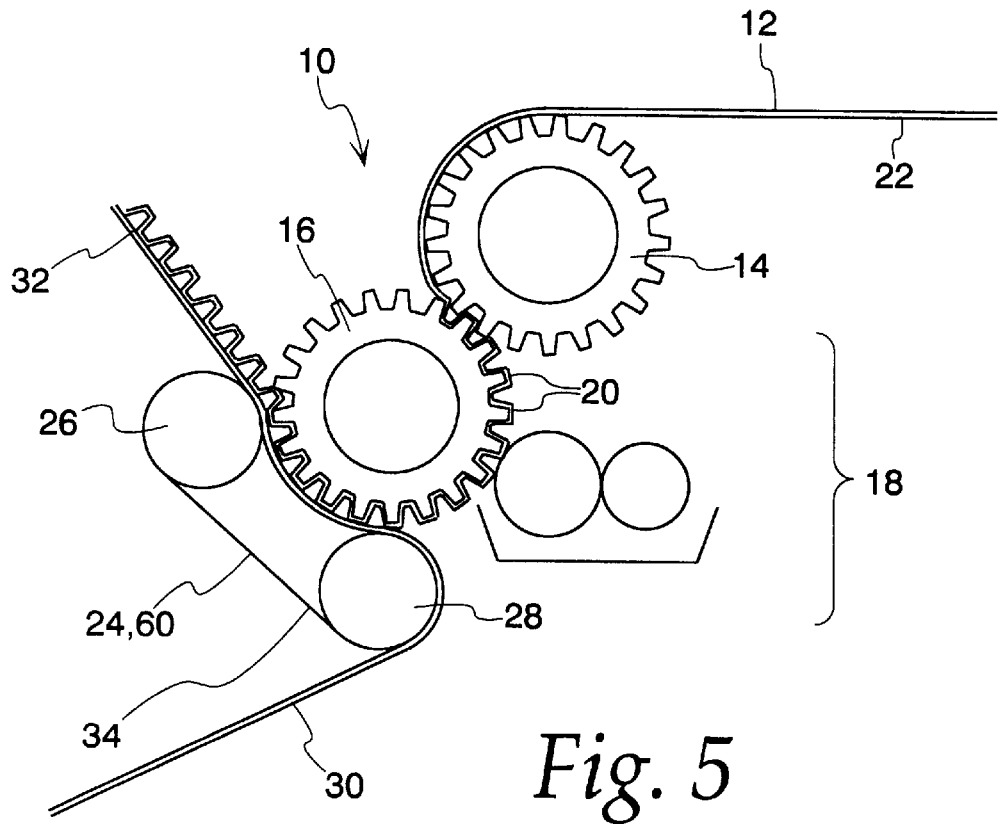
FIG. 5 is a schematic form of a corrugated board manufacturing system incorporating a wide conveying belt as in FIGS. 3 and 4.

In FIGS. 3 and 4, a conveying belt 60, according to the present invention, as may be incorporated into a machine as shown at 10 in FIG. 5 and previously described herein, is shown. The conveying belt 60 is a wide belt having a very thin profile. More specifically, the width of the belt may range from 1200 to 3000 mm with a thickness TI (FIG. 3) being generally no more than 3.5 mm so that the necessary thermal conduction can take place. The thin sheet shape of the conveying belt 60 facilitates conforming contact with forming rolls over a wide area.

The conveying belt 60 consists of a core 62, which is preferably canvas, and a woven canvas layer 64 attached/laminated to the core 62 through an elastomer adhesive layer 66. The canvas layer 64 has oppositely facing first and second surfaces 68, 70, with the latter being exposed to define the conveying surface to engage and frictionally convey articles in contact therewith as the conveying belt 60 advances.

The canvas in the core 62 is a woven canvas having a low elongation and a high strength. More specifically, the canvas is woven into an endless cylindrical shape using aromatic polyamide fiber yarn (aramid fiber) or a polyetheretherketone fiber yarn. The canvas in the core 62 is preferably woven in a seamless pattern with no flute difference in the longitudinal and widthwise directions of the belt.

The canvas in the core 62 may be woven by a plain weave, matt weave, twill elastic webbing or satin weave process using longitudinal cords 72 and lateral cords 74 each formed by twisting 2 to 10 yarns each having a thickness in the range of 1000 to 2000 denier. The cords 72, 74 are formed by bundling and/or twisting filament fibers. Using 1000 to 2000 denier yarns, the yarns are twisted in a range of 50 to 100 twists/m.

The density of the cords 72, 74 is on the order of 10 to 50 per 5 cm. Deviation in the number of cords is preferably within ±0.5 throughout the entire length and width of the canvas in the core 62. This avoids localized excessive elongation of the conveying belt 60 and minimizes the likelihood of premature failure occasioned by stress concentration.

Belt shifting is avoided by alternatingly twisting the longitudinal cords 72 in the S and Z directions.

The elastomer layer 66 is preferably a heat resistant elastomer made of rubber or synthetic resin that may be, for example, styrene-butadiene rubber, ethylene propylene rubber, butyl rubber, hydrogenated nitrile rubber, fluorine rubber, or polytetrafluoroethylene, that is laminated on the upper surface of the canvas in the core 62.

Short fibers 76 may be embedded in the elastomer layer 66. The fibers 76 have a length in the range of 2–20 mm. The fibers 76 are preferably made from a durable material such as aromatic polyamide fiber (aramid), cotton fiber, or a polyester fiber. The fibers 76 are embedded in the elastomer layer 66 so that their lengths are aligned generally with the width of the belt, identified by W in FIG. 4. Preferably the fibers 76 are present in an amount of 5–30 weight parts per 100 weight parts of rubber or synthetic resin.

The canvas layer 64 is laminated to the elastomer layer 66 to be extensible lengthwise of the belt 60. The canvas layer 64 has longitudinally extending cords 80 which may be made from mixed-twisted yarns of aromatic polyamide fiber, which may be para-aramid or meta-aramid type, and a urethane elastic fiber. The lateral cords 82 align widthwise of the belt 60 and may be made by a plain weave, twill elastic webbing or satin weave process using aromatic polyamide fiber yarn, nylon fiber yarn, or polyester fiber yarn. The layer 64 may alternatively be formed as a knitted canvas using aromatic polyamide fiber yarn.

In the event that para-fiber yarns are used for the longitudinal cords 80, the yarns may have a size within a range of 100–300 denier with 1–3 twists. In the event that meta-aramid fiber yarns are used, the yarn number count may vary from a size of 20 to 40 yarns, with 1–4 twists. In the event of a mixed-twisted yarn using urethane elastic fiber, the yarns each have a denier of 140 with a count from 100 to 140 per 5 cm.

With the lateral cords 82, in the event para-aramid fiber yarns are used, the yarn size is preferably within a range of from 100 to 300 denier with 1–3 twists. In the event meta-aramid fiber yarns are used, the size is from 20–40 spinning yarn number count with 1–4 twists. In the event nylon fiber yarns or polyester fiber yarns are used, the yarns are preferably each 100–300 denier, with 1–3 twists and a count of 70 to 100 per 5 cm.

By using an elastomer fiber yarn for the longitudinal cords 80, the elongation may be higher than 100% as represented by a cut elongation.

The aromatic polyamide fiber that may be used to form at least a part of the core canvas 62 and the canvas layer 64 may include para- and meta-based fibers. Suitable para-aramid fiber (polyparaphenyleneisophthalamide) products currently sold commercially under the trademarks TWARON™ (by Enca Company), KEVLAR™ (by DuPont Co.) and TECHORA™ (by Teijin Co.) may be used. In the event of meta-aramid fibers, (polymetalphenyleneisophthalamide) products currently sold commercially under the trademarks CORNEX™ (by Teijin Co.) and NOMEX™ (by Dupont Co.) may be used.

In the event a 2/2 twill elastic webbing canvas is used as the canvas layer 64, the canvas may be treated by vibration in water after weaving to cause contraction of the width to one-half or two-thirds. When applied to the belt core 62, the canvas readily conforms to accommodate deformation of the belt as it is run and bent, thereby reducing the likelihood of peeling of the canvas layer 64.

A method of manufacturing a general purpose conveying belt 10 or wide conveying belt 60, as for use with the corrugating machine 10, according to the present invention, will now be described with reference to FIGS. 1–4. Three processes for impregnating the canvas layers 44, 64 will be described: a first (Process A) being a fusion-depositing of a fluororesin film with the use of a thickener; and a second (Process B) being the application of a fluororesin dispersion. The third process (Process C) involves the combination of the first and second processes.

Process A

In the fusion-deposition of the fluororesin film, any one of PFA, FEP and PTFE and PCTFE may be used. A powdery solid fluororesin is melted to prepare a film with a thickness in the range of 50 to 500 $\mu$m. Selection of the thickness of the film is determined by the thickness of the weaving yarn and the overall thickness of the canvas.

The film is placed on the surface 48, 70 of the canvas layer 44, 64 and pressed while heating. The temperature is chosen to be at the melting point of the fluororesin film plus approximately 30° C. The pressing treatment is carried out for from 30 seconds to three minutes with the pressure being maintained at 2 to 10 kgf/cm$^2$.

Process B

In the fluororesin dispersion process, the fluororesin dispersion has a viscosity within a range of 1000 to 10,000 cps.

The blending ratio of a thickener mixed with the powdery solid fluororesin, for example methyl cellulose, is within a range of 1 to 10 weight parts per 100 weight parts of resin.

The powdery solid fluororesin, the thickener, and water are mixed. The resulting mixture is uniformly sprinkled over the surface 48, 70 of the canvas layer 44, 64 to a thickness of 10 to 300 μm. A firing treatment is then carried out at a temperature equal to the melting point of the fluororesin material plus approximately 30° C. for 3 to 30 minutes. The center on the surface 48, 70 is impregnated with the resulting molten fluororesin.

When forming a film from the fluororesin layer deposited on the surfaces 48, 70 after the firing treatment, described above, a heat press treatment is carried out. The pressing is carried out at a temperature equal to the melting point of the fluororesin plus approximately 30° C. for 30 seconds to 3 minutes at a pressure from 2–10 kgf/cm².

In the dispersion treatment, the fluororesin is dispersed over the surface 48, 70 of the canvas layer 44, 64. Melting of the fluororesin and film forming of the resin on the surface 48, 70 are simultaneously carried out by using a heat press treatment on the canvas layer 44, 64 without the firing described above. This is carried out at a temperature equal to the melting point of the fluororesin plus approximately 30° C. for 30 seconds to 15 minutes at a pressure of 2–10 kgf/cm².

Process C

This treatment process involves a combination of the above two Processes A and B. More specifically, impregnation and coating of the fluororesin onto the canvas layer 44, 64 may be carried out by the dispersion process followed by the fluororesin film process.

Impregnation of the fluororesin is carried out concentrically. The treatments are dictated by the thickness of the canvas layers 44, 64, the weaving density of the yarn, the thickness of the weaving yarn, the fluororesin film thickness, and the quantity of dispersion of powdery solid fluororesin.

A more detailed description of one exemplary fluororesin film-depositing process (Process A) will now be described.

Example 1

The core canvas 42, 62 was a seamless canvas made of aromatic polyamide. A heat resistant elastomer was used as an adhesive between the core canvas 42, 62 and the canvas layer 44, 64. The heat resistant elastomer was made from hydrogenated nitrile rubber. A PFA film having a thickness of 100 μm was provided on the surface 48, 70 of the canvas layer 44, 64 and treated at a temperature of 350° C. for two minutes at a pressure of 5 kgf/cm².

A more detailed example of the dispersion treatment process(Process B) will now be described for a wide conveying belt 60.

Example 2

The canvas in the core 62 and the elastomer layer 66 had the same make up as those in Example 1. The fluororesin was PFA having a 50% solid content. The PFA, a thickener, and water were dispersed over the surface 70, fired and heat pressed with a quantity of 500 g/m² dry deposited resin. The firing temperature was 350° C. for 3 minutes. The pressing temperature was 350° C. with pressing carried out for 2 minutes at a pressure of 5 kgf/cm². These treatments formed a film of the fluororesin on the surface 70 of the canvas layer 64.

Comparative Example 1

This belt was a sample of the wide belt as disclosed in Japanese Provisional Publication No. 7-60877. A blend of 500 weight parts of polytetrafluoroethylene (PTFE) and 100 weight parts of hydrogenated nitrile rubber (HNBR) elastomer were used as a coating.

Comparative Example 2

Hydrogenated nitrile rubber (HNBR) was used alone as a coating material for the exposed surface of the canvas layer.

The only difference between the Examples 1 and 2 and Comparative Example 1 is that, for the Comparative Example 1, the impregnating of the canvas with fluororesin was carried out with a coating layer formed with a heat resistant elastomer and a powdery fluororesin blend.

The results of the comparative testing for the four belt examples are shown in Table 1, below.

TABLE 1

|  | Example 1 | Example 2 | Comparative Example 1 | Comparative Example 2 |
| --- | --- | --- | --- | --- |
| I | 0.25 | 0.26 | 0.40 | 0.60 |
| II | No adhesion of adhesive | No adhesion of adhesive | No adhesion of adhesive | Adhesion of adhesive observed |
| III | 21.0 | 19.5 | 19.5 | 22.0 |

I = Exposed canvas layer belt surface frictional coefficient
II = Strippability of starch adhesive
III = Adhesion between exposed canvas layer belt surface and core components (kgf/25 mm)

The inventive belts perform well in terms of frictional coefficient, strippability, and adhesion.

As previously mentioned, the invention allows the belts 40, 60 to be constructed so that the desired frictional force between the canvas layers 44, 64 and objects being conveyed can be developed. At the same time, the inventive construction prevents aggressive adhesion of foreign matter encountered in operation. By facilitating removal of deposits of foreign matter on the belt surfaces 48, 70, maintenance of the belts 40, 60 is facilitated. The life of the belt may also be lengthened. The invention further allows these properties to be realized without compromising adhesion between the canvas layers 44, 64 and the other belt components to which they are laminated. At the same time, by limiting the use of expensive fluororesin material, the construction of the belts 40, 60 can be economically carried out.

The invention also contemplates that that fluororesin without an elastomer can be used to treat the belt surfaces 48, 70, thereby avoiding the previously described detrimental effects associated with the elastomer on the surfaces 48, 70.

By manufacturing the belt using the fusion-depositing method, application of the fluororesin film may be simplified. Uniform deposition is made possible while again minimizing the requirements for the expensive fluororesin material.

Through the dispersion method, the fluororesin can be caused to thoroughly migrate into the yarns in the high density canvas, to allow uniform and accurate impregnation.

By using a combination of the fusion-depositing and dispersion, complete and controlled impregnation can be carried out to the desired depth within the canvas layer 44, 64.

The foregoing disclosure of specific embodiments is intended to be illustrative of the broad concepts comprehended by the invention.

We claim:

1. A conveying belt comprising:
a core; and
a canvas layer attached to the core,
the canvas layer having a first surface facing the core and a second surface facing oppositely to the first surface,
the canvas layer having a thickness between the first and second surfaces, the canvas layer being treated with fluororesin so that the second surface is impregnated with fluororesin and only a part of the thickness between the first and second surfaces is impregnated with fluororesin.

2. The conveying belt according to claim I wherein the first surface of the canvas layer is not impregnated with fluororesin.

3. The conveying belt according to claim 1 wherein the canvas layer is not impregnated with fluororesin from the first surface to approximately one-half of the thickness between the first surface and second surface.

4. The conveying belt according to claim 1 wherein the canvas layer comprises a high density woven canvas.

5. The conveying belt according to claim 1 wherein the core comprises a canvas layer.

6. The conveying belt according to claim 5 wherein the conveying belt has a length and a width and the core canvas layer is seamless over the entire length and width of the conveying belt.

7. The conveying belt according to claim 1 wherein the conveying belt has a length and a width and the canvas layer is extensible lengthwise of the conveying belt.

8. The conveying belt according to claim 7 wherein the canvas layer is attached to the core through an elastomer.

9. The conveying belt according to claim 1 wherein the conveying belt has a length and width, the width of the conveying belt is on the order of 1200 to 3000 mm and the conveying belt has a thickness on the order of 3.5 mm.

10. The conveying belt according to claim 1 wherein the fluororesin comprises at least one of: tetra-fluoroethylene-per fluoroalkylvinylether copolymer) (PFA); tetrafluoroethylene-hexafluoropropylene copolymer (FEP); polytetrafluoro-ethylene (PTFE); and polychlorotrifluoroethylene (PCTFE).

11. The conveying belt according to claim 10 wherein the second surface and part of the thickness of the canvas layer are impregnated with fluororesin by fusion-depositing a fluororesin film onto the second surface of the canvas layer.

12. The conveying belt according to claim 10 wherein the second surface and part of the thickness of the canvas layer are impregnated with fluororesin by applying a fluororesin dispersion onto the second surface and thereafter subjecting the canvas layer to at least one of a firing and a heat press treatment.

13. The conveying belt according to claim 12 wherein the second surface and part of the thickness of the canvas layer are impregnated with fluororesin by depositing a fluororesin film onto the second surface after subjecting the canvas layer to the at least one of firing and heat press treatment.

14. The conveying belt according to claim 1 wherein the core comprises a woven canvas comprising at least one of aromatic polyamide fiber yarn and polyetheretherketone fiber yarn.

15. The conveying belt according to claim 1 wherein the core comprises canvas that is woven by one of a plain weave, a matt weave, twill elastic webbing, and a satin weave process.

16. The conveying belt according to claim 15 wherein the core canvas comprises woven cords each formed by twisting two to ten yarns, each having a denier of 1000 to 2000 and 50 to 100 twists/m with a cord density of 10 to 50 per 5 cm.

17. The conveying belt according to claim 1 wherein an elastomer layer is provided between the core and canvas layer, said elastomer layer comprising at least one of rubber and a synthetic resin comprising at least one of styrene-butadiene rubber, ethylene propylene rubber, butyl rubber, hydrogenated nitrile rubber, fluorine rubber, and polytetrafluoroethylene.

18. The conveying belt according to claim 17 further comprising fibers embedded in the elastomer layer, said fibers having a length on the order of 2–20 mm, comprising at least one of aromatic polyamide fibers, cotton fibers, and polyester fibers, and present in an amount of 5–30 weight parts of fiber per 100 weight parts of the at least one of rubber and synthetic resin.

19. The conveying belt according to claim 1 wherein the longitudinal cords of the canvas layer comprise a mixed-twisted yarn of aromatic polyamide fiber and urethane elastic fiber.

20. The conveying belt according to claim 19 wherein the yarn comprises urethane elastic fiber yarn of 140 denier per yarn and a count of 100–140 yarns per 5 cm.

21. The conveying belt according to claim 1 wherein the lateral cords of the canvas layer comprise one of a) yarns that comprise at least one of aromatic polyamide fiber yarn, nylon fiber yarn, and polyester yarn that are woven by one of plain weaving, twill elastic webbing and satin weaving and b) knitted aromatic polyamide fiber yarn.

22. The conveying belt according to claim 21 wherein the yarns comprise para-aramid fiber yarn having a size of 100–300 denier with 1–3 twists.

23. The conveying belt according to claim 21 wherein the yarns comprise meta-aramid fiber yarns having a size of 20–40 spinning yarn number count and 1–4 twists.

24. The conveying belt according to claim 21 wherein the yarns comprise at least one of nylon fiber yarn and polyester fiber yarn having a size of from 100–300 denier, 1–3 twists, and a count of from 70–100 per 5 cm.

25. The conveying belt according to claim 1 wherein the canvas layer comprises para-aramid fiber yarn having a size of 100–300 denier with 1–3 twists.

26. The conveying belt according to claim 1 wherein the canvas layer comprises meta-aramid fiber yarn having a size of from 20–40 yarn number count with 1–4 twists.

27. The conveying belt according to claim 1 wherein at least one of the core and canvas layer comprises fibers that are at least one of a) para-aramid fiber that is sold commercially under one of the trademarks TWARON™, KEVLAR™, TECHNORA™ and b) meta-aramid fiber that is sold commercially under one of the trademarks CORNEX™ and NOMEX™.

28. A method of forming and using a conveying belt, said method comprising the steps of:
providing a canvas layer having first and second oppositely facing surfaces between which a thickness is defined;
impregnating the second surface and only a part of the thickness between the first and second surfaces with a fluororesin;
joining the canvas layer with at least one belt component to define a completed belt with the second surface exposed; and
conveying an object by engaging the second surface with the object and advancing the conveying belt to hereby cause conveying of the object.

29. The method of forming and using a conveying belt according to claim 28 wherein the impregnating step comprises the step of impregnating by fusion-depositing a fluororesin film onto the second surface of the canvas layer.

30. The method of forming and using a conveying belt according to claim 28 wherein the impregnating step comprises the step of impregnating by applying a fluororesin dispersion onto the second surface and thereafter subjecting the canvas layer to at least one of a firing and a heat press treatment.

31. The method of forming and using a conveying belt according to claim 28 wherein the impregnating step comprises the step of impregnating by depositing a fluororesin dispersion onto the second surface after subjecting the canvas layer to the at least one of firing and heat press treatment.

* * * * *